Feb. 15, 1949.    C. W. P. WALTER    2,461,616
CONTACT FIXTURE
Filed March 29, 1945
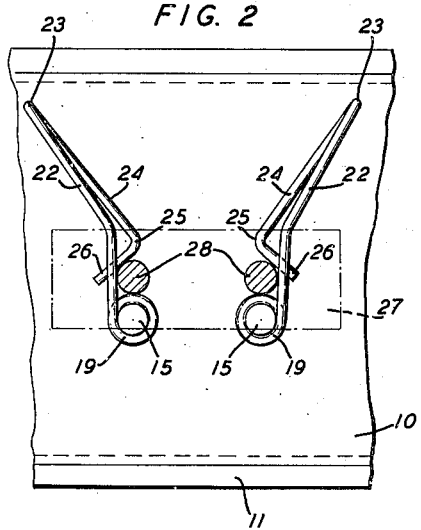
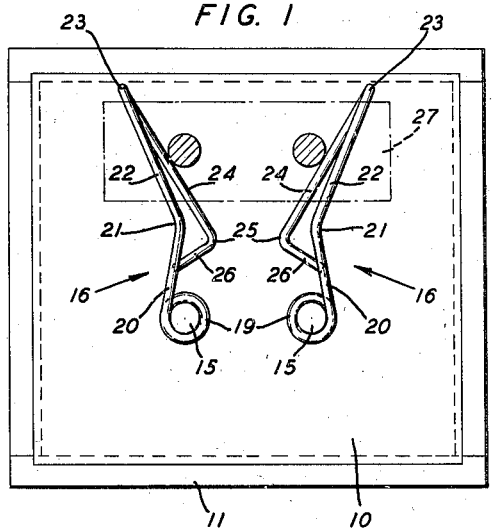
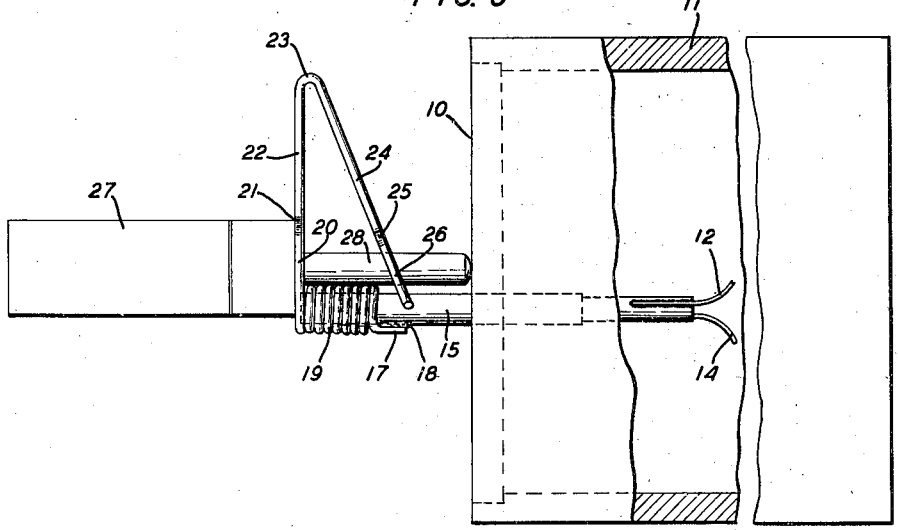
INVENTOR
C.W.P. WALTER
BY
ATTORNEY Patented Feb. 15, 1949

2,461,616

UNITED STATES PATENT OFFICE 2,461,616

CONTACT FIXTURE

Charles W. P. Walter, Woodhaven, N. Y., assignor to Western Electric Company, Incorporated, New York, N. Y., a corporation of New York Application March 29, 1945, Serial No. 585,477

6 Claims. (Cl. 173—328)

This invention relates to contact fixtures, particularly for use in connecting articles in electrical circuits.

In the manufacture of articles or electrical units for use in the communication arts, it is customary to test such articles subsequent to various steps of the manufacture thereof and after the articles have been completed. Certain of these tests include connecting the articles or units electrically in a circuit of a test set to determine whether or not they meet with given requirements, the number of such articles or units tested in a given length of time depending greatly upon the speed and accuracy in which the article may be included in and removed from the test set or the circuit through which the test is to be made.

An object of the invention is to provide a contact fixture which is simple in structure, easily manufactured, and highly efficient for forming electrical connections with terminals of an article.

With this and other objects in view, the invention comprises a contact fixture having a base or panel, with posts mounted at spaced positions thereon, and resilient contact elements having spiral portions disposed concentric with the posts and having their inner ends fixed thereto, their outer ends having integral portions, lying in a plane at an angle with respect to the center lines of the posts and extending diagonally toward each other to positions a given distance apart and then extending diagonally away from each other to given spaced positions.

Other objects and advantages will be apparent from the following detailed description when considered in conjunction with the accompanying drawing, wherein Fig. 1 is a front elevational view of the contact fixture illustrating the terminals of an article in one position;

Fig. 2 is a fragmentary front elevational view of the contact fixture illustrating the terminals of an article at another or locked position, and Fig. 3 is a side elevational view of the contact fixture illustrating the terminals of the article at the same position as illustrated in Fig. 2.

Referring now the drawing, the contact fixture includes a base or panel 10 which may serve as a cover for a housing 11 of a testing unit or the like, in which an electrical circuit, represented by conductors 12 and 14, is disposed. The panel 10 is apertured to receive supporting posts 15 which extend into the housing 11 and have the conductors 12 and 14 respectively secured to the inner ends thereof. The outer ends of the posts 15 have contact elements, indicated generally at 16, mounted thereon. The elements 16 are substantially identical in structure, the only difference being that they are reversed in their formation, one being a left hand contact element and the other, a right hand contact element.

Each element is formed of a suitable resilient material and has an end 17 fixed by soldering or welding 18 to its respective post 15. Spiral convolutions 19 are formed in the elements adjacent the first mentioned ends thereof and extend forwardly to the outer ends of their supporting posts. From the spiral portions 19, portions 20 of the elements extend diagonally toward each other in a plane at right angles to the plane of the center lines of the posts to portions 21 and then portions 22 extend diagonally away from each other in the same plane to portions 23. From the portions 23, the material of the elements extend diagonally toward the panel, in a plane at angles with respect to the other planes, and toward each other to portions 25, after which the materials of the elements extend diagonally away from each other to provide feet holding portions 26. The portions 21, 23 and 25 may be defined as bends while the portions 20, 22 and 24 form one leg of each element and the portions 26 form other legs thereof.

In the present instance, the article to be tested is a quartz crystal unit 27 having terminals 28 disposed at spaced positions known overall distances apart. To test the units 27, it is necessary that the terminals 28 be connected to the respective conductors 12 and 14 of the testing circuit.

Upon considering the function of the contact fixture, the operator may repeatedly introduce articles such as the unit 27 into the testing circuit by moving the unit singly until the ends of their terminals engage the outer surface of the panel 10 and then lower the unit, guided by the panel until the terminals engage their respective contact elements 16. As illustrated in Fig. 1, the degree of force existing in the contact elements on the terminals of the article or unit under test may be varied by varying the position of the article with respect to the contact elements or the supporting posts 15. While the article is in the position shown in Fig. 1, the terminals will rest upon the legs 24 of the contact elements 16, this illustrating the minimum pressure contact between the elements and the terminals. Also, if desired, the article may be tilted or moved at an angle with respect to the panel so that the terminals will rest upon both of the legs of each contact element. As the article is moved downwardly, the combined force of the elements increases and eventually the both legs of each of the contacts will be engaging their respective terminals, not only increasing the contact force applied to the terminals, but also doubling the points of contact therewith. If the operator chooses, this contact force may be increased to a given maximum force and the contact elements may function to latch the terminals of the article in place. This may be accomplished by moving the article downwardly until the terminals 28 pass beyond the portions 25 and into the positions shown in Figs. 2 and 3. At this time, the terminals rest upon the spiral portions 19 and receive the added force of both legs of each of the contact elements aided by the force inherent in the spiral portions which the terminals have tended to partially unwind in passing to the position shown in Figs. 2 and 3. In this position, there are three points of contact for each terminal, this being the maximum pressure position, as well as the latching position for the contact elements. From this position the article may be removed by an outward pull thereon.

Although specific improvements of the invention have been shown and described, it will be understood that they are but illustrative and that various modifications may be made therein without departing from the scope and spirit of this invention as defined by the appended claims.

What is claimed is:

1. A contact fixture comprising a base, posts mounted at spaced positions thereon, and resilient contact elements having spiral portions disposed concentric with the posts and having their inner ends fixed thereto, their outer ends having integral portions, lying in a plane at an angle with respect to the center lines of the posts, extending diagonally toward each other to positions a given distance apart, then extending diagonally away from each other to given spaced positions, and finally bent back toward the posts and extending toward each other to positions a shorter distance apart than the said given distance.

2. A contact fixture comprising a base, posts mounted at spaced positions thereon, and resilient contact elements each with an end fixed to their respective post, the adjacent portions thereof lying in a plane at an angle with respect to the center lines of the posts, extending diagonally toward each other to positions a given distance apart, then extending diagonally away from each other to given spaced positions to complete one leg for each element, then extending diagonally toward their opposing posts to positions a shorter distance apart than the said given distance to form another leg for each element, and finally extending diagonally away from each other to form feet for the last mentioned legs.

3. A contact fixture for electrically connecting a unit, having terminals mounted adjacent the limits of a given overall distance with respect to each other, in an electrical circuit, the contact fixture comprising a panel of dielectric material having spaced apertures therein, supporting posts extending through the apertures in the panel and having outer and inner end portions, the latter being connected electrically to leads of an electrical circuit, and contact springs having like ends, secured to the said outer end portions of the posts, and like portions extending diagonally toward each other to positions short of the said distance of the terminals, and then extending diagonally away from each other to positions greater than the said distance of the terminals to form a tapered opening between the contact springs, the outer end of which is wider than the said given distance whereby the unit may be moved laterally to move the terminals into the opening in engagement with their respective contact springs.

4. A contact fixture for electrically connecting a unit, having terminals mounted adjacent the limits of a given overall distance with respect to each other, in an electrical circuit, the contact fixture comprising a panel of dielectric material having spaced apertures therein, supporting posts extending through the apertures in the panel and having outer and inner end portions, the latter being connected electrically to leads of an electrical circuit, and contact springs having like ends, secured to the said outer end portions of the posts, adjacent portions wound spirally on the outer end portions, and like portions extending diagonally toward each other to positions short of the said distance of the terminals, and then extending diagonally away from each other to positions greater than the said distance of the terminals to form a tapered opening between the contact springs, the outer end of which is wider than the said given distance, whereby the unit may be moved laterally to move the terminals into the opening in engagement with their respective contact springs.

5. A contact fixture for electrically connecting a unit, having terminals mounted adjacent the limits of a given overall distance with respect to each other, in an electrical circuit, the contact fixture comprising a panel of dielectric material having spaced apertures therein, supporting posts extending through the apertures in the panel and having outer and inner end portions, the latter being connected electrically to leads of an electrical circuit, and contact springs having like ends, secured to the said outer end portions of the posts, adjacent portions wound spirally on the outer end portions, and like portions extending diagonally toward each other to positions short of the said distance of the terminals, for electrical contact therewith, and then extending diagonally away from each other to positions greater than the said distance of the terminals, the spiral portions and the adjacent diagonal portions being formed to jointly grip the terminals.

6. A contact fixture for electrically connecting a unit, having terminals mounted adjacent the limits of a given overall distance with respect to each other, in an electrical circuit, the contact fixture comprising a panel of dielectric material having spaced apertures therein, supporting posts extending through the apertures in the panel and having outer and inner end portions, the latter being connected electrically to leads of an electrical circuit, and contact springs having like ends secured to the outer portions of the posts, adjacent first portions wound spirally on the outer end portions, like second portions extending diagonally toward each other to positions short of the said distance of the terminals, third portions extending diagonally away from each other to positions greater distances apart than the said distances of the terminals, substantially reverse bends formed at the ends of the third portions, fourth portions extending diagonally toward each other to positions short of the said distance of the terminals and fifth portions extending diagonally away from each other to cooperate with the first and second portions to form resilient pockets for removably locking the terminals in place.

CHARLES W. P. WALTER.

REFERENCES CITED

The following references are of record in the file of this patent:

UNITED STATES PATENTS

| Number | Name | Date |
| --- | --- | --- |
| 1,208,217 | Schade, Jr. | Dec. 12, 1916 |
| 1,485,175 | Ellis | Feb. 26, 1924 |
| 2,075,632 | Zuckerman | Mar. 30, 1937 |
| 2,124,461 | Challet | July 19, 1938 |
| 2,316,555 | Bugg | Apr. 13, 1943 |